(12) United States Patent
Chen et al.

(10) Patent No.: US 7,113,553 B2
(45) Date of Patent: Sep. 26, 2006

(54) LOW-COMPLEXITY JOINT SYMBOL CCK DECODER

(76) Inventors: Jeng-Hong Chen, 5600 Heleo Ave., Temple City, CA (US) 91780; Wei-Chung Peng, 27013 Springcreek Rd., Rancho Palos Verdes, CA (US) 90275

( * ) Notice: Subject to any disclaimer, the term of this patent is extended or adjusted under 35 U.S.C. 154(b) by 741 days.

(21) Appl. No.: 10/382,756

(22) Filed: Mar. 5, 2003

(65) Prior Publication Data
US 2004/0091019 A1 May 13, 2004

Related U.S. Application Data

(63) Continuation-in-part of application No. 10/289,749, filed on Nov. 7, 2002.

(51) Int. Cl.
*H03D 3/22* (2006.01)
*H03B 1/10* (2006.01)
(52) U.S. Cl. .................... 375/329; 375/347
(58) Field of Classification Search ......... 375/329, 375/322, 347
See application file for complete search history.

(56) References Cited

U.S. PATENT DOCUMENTS 6,977,974 B1 * 12/2005 Geraniotis et al. ........ 375/340

| 2001/0036223 | A1 |   | 11/2001 | Webster et al. |         |
|--------------|----|---|---------|----------------|---------|
| 2003/0123585 | A1 | * | 7/2003  | Yen            | 375/350 |
| 2003/0147478 | A1 | * | 8/2003  | Chang et al.   | 375/340 |
| 2004/0091023 | A1 | * | 5/2004  | Chen et al.    | 375/148 |

* cited by examiner

*Primary Examiner*—Kevin Kim
(74) *Attorney, Agent, or Firm*—Raymond Sun (57) ABSTRACT

A method is provided for mitigating the multipath interference experienced by a present CCK symbol. This method first obtains a set of initial candidates for the present CCK symbol and a set of initial candidates for the next CCK symbol based on the ICI-corrected correlation outputs for the present and next CCK symbols, respectively. The method then obtains, for each of the candidates for the present CCK symbol, first ISI-mitigated correlation outputs where both the ICI due to the present CCK symbol and the ISI due to the next CCK symbol have been corrected. Thereafter, for each of the candidates for the present CCK symbol, and based on the first ISI-mitigated correlation outputs, the method obtains second ISI-mitigated correlation outputs where the ISI due to the previous CCK symbol has also been corrected. The present CCK symbol is then decoded based on the second ISI-mitigated correlation outputs.

8 Claims, 6 Drawing Sheets

| m | Correlation Outputs for k-th CCK codeword | Pre-computed FMIC Bias ($\alpha \cdot ICI_m$) | Step 1: Compute ICI-corrected Correlation Outputs | Step 2: Select the $M_k$ greatest (assume $M_k=3$) | Repeat Step 1 and 2 for the k+1-th Codeword (assume $M_{k+1}=3$) | | |
|---|---|---|---|---|---|---|---|
| | | | | | Correlation Outputs for k+1-th CCK codeword | Step 1: Compute ICI-corrected Correlation Outputs | Select the $M_{k+1}$ greatest (assume $M_{k+1}=3$) |
| 0 | $Re\{R_k^H \underline{C}_0\}=7$ | $Re\{\alpha \cdot ICI_0\}=1$ | $6 (=7-1)$ | | $Re\{R_{k+1}^H \underline{C}_0\}=9$ | $8=(9-1)$ | $\hat{C}_{k+1,1} = \underline{C}_0$ |
| 1 | $Re\{R_k^H \underline{C}_1\}=8$ | $Re\{\alpha \cdot ICI_1\}=-1$ | $9 (=8-(-1))$ | $\hat{C}_{k,1} = \underline{C}_1$ and $P_{k,1}=9$ | $Re\{R_{k+1}^H \underline{C}_1\}=3$ | $4=(3-(-1))$ | |
| 2 | $Re\{R_k^H \underline{C}_2\}=1$ | $Re\{\alpha \cdot ICI_2\}=0.3$ | $0.7 (=1-0.3)$ | | $Re\{R_{k+1}^H \underline{C}_2\}=6$ | $5.7=(6-0.3)$ | |
| 3 | $Re\{R_k^H \underline{C}_3\}=7$ | $Re\{\alpha \cdot ICI_3\}=-0.5$ | $7.5 (=7-(-0.5))$ | $\hat{C}_{k,3} = \underline{C}_3$ and $P_{k,3}=7.5$ | $Re\{R_{k+1}^H \underline{C}_3\}=4$ | $4.5=(4-(-0.5))$ | |
| 4 | $Re\{R_k^H \underline{C}_4\}=3$ | $Re\{\alpha \cdot ICI_4\}=-1.5$ | $4.5 (=3-(-1.5))$ | | $Re\{R_{k+1}^H \underline{C}_4\}=6$ | $7.5=(6-(-1.5))$ | $\hat{C}_{k+1,3} = \underline{C}_4$ |
| ... | ............... | ............... | ............... | | | | |
| 253 | $Re\{R_k^H \underline{C}_{253}\}=2$ | $Re\{\alpha \cdot ICI_{253}\}=0.2$ | $1.8 (=2-0.2)$ | | $Re\{R_{k+1}^H \underline{C}_{253}\}=8.1$ | $7.9=(8.1-0.2)$ | $\hat{C}_{k+1,2} = \underline{C}_{253}$ |
| 254 | $Re\{R_k^H \underline{C}_{254}\}=9$ | $Re\{\alpha \cdot ICI_{254}\}=0.3$ | $8.7 (=9-0.3)$ | $\hat{C}_{k,2} = \underline{C}_{254}$ and $P_{k,2}=8.7$ | $Re\{R_{k+1}^H \underline{C}_{254}\}=3$ | $2.7=(3-0.3)$ | |
| 255 | $Re\{R_k^H \underline{C}_{255}\}=6$ | $Re\{\alpha \cdot ICI_{255}\}=-0.5$ | $6.5 (=6-(-0.5))$ | | $Re\{R_{k+1}^H \underline{C}_{255}\}=-6$ | $-6.5=(-6-0.5)$ | |

FIG. 7

LOW-COMPLEXITY JOINT SYMBOL CCK DECODER

RELATED CASES

This is a continuation-in-part of U.S. application Ser. No. 10/289,749, filed Nov. 7, 2002 and entitled "Packet-based Multiplication-free CCK Demodulator with a Fast Multipath Interference Cipher", whose disclosure is incorporated by this reference as though set forth fully herein.

BACKGROUND OF THE INVENTION

1. Field of the Invention

The present invention relates to wireless communication systems, such as but not limited to wireless local area networks (WLANs), and in particular, to an 802.11b Complementary Code Keying (CCK) receiver which mitigates inter-symbol and intra-symbol distortions due to multipath propagation.

2. Description of the Prior Art

U.S. Patent Application Publication No. 2001/0036223 to Webster et al.("Webster") discloses a RAKE receiver that is used for indoor multipath WLAN applications on direct spread spectrum signals having relatively short codeword lengths. FIGS. 6, 7, 8, and 10 of Webster illustrate a RAKE receiver which has an embedded chip-based decision feedback equalizer (DFE) structure provided in the signal processing path between the receiver's channel matched filter (CMF) and codeword correlator. The DFE serves to cancel Inter-Symbol Interference (ISI), which is also known as inter-codeword interference (i.e., bleed-over between CCK codewords), of the previous CCK codeword.

FIGS. 12–14 of Webster illustrate an Intra-Symbol Chip Interference (ICI) canceller which is designed to cancel the ICI generated from the post-cursors through the use of lengthy complex operations (multiplications and additions), and includes one DFE convolution block and one codeword correlation block for each and every codeword (up to 256 codewords in total) in a 802.11b CCK Decoder. Each of the 64 or 256 ICI outputs is calculated independently from a separate processing path.

In FIG. 12 of Webster, for each and every codeword (256 codewords in total), three basic building blocks are required: (i) one DFE convolution block 1220 which calculates chip-by-chip representation of the ICI before the codeword correlator 1230 using the complex convolution between each codeword (8 complex chips denoted as OW#k CHIP) and up to 8 complex DFE taps, (ii) one chip-by-chip subtractor 1210 which subtracts each of the 8 received complex chips (block 1203) from the outputs of block 1220, and (iii) one codeword correlator 1230 which calculates the correlation between each codeword (8 complex chips) and the results (8 complex chips) from the subtractor 1210. All these operations are complex and are required for each codeword. In short, 256 ICI bias outputs 1212 are calculated independently at blocks 1220, subtracted in parallel at blocks 1210, and then 256 correlations outputs are found from the codeword correlators 1230. Because the input 1223 to each codeword correlator 1230 is now different after the ICI bias correction, this architecture prevents the use of a fast Walsh transform implementation to jointly and effectively calculate the CCK correlations for all CCK codewords.

In another embodiment illustrated in FIG. 13 of Webster, for each and every codeword (64 codewords in total), two basic building blocks (which have the same functions described above) are required: (i) one DFE convolution block 1340 and (ii) one codeword correlator 1330. The number of DFE blocks and correlation blocks required is simplified from 256 to 64. The 64 ICI outputs of blocks 1330 are expanded into 256 ICI outputs from complex operations. Compared to FIG. 12, this architecture calculates the ICI bias for post-CCK codeword correlator correction 1360. Therefore, a codeword correlator to jointly and effectively compute CCK correlations can be effectively implemented using a 64 element fast Walsh transform 1320 and a 1 to 4 expansion 1350. However, each of the 64 post-correlation ICI bias is first calculated using complex convolution 1340 and complex correlation 1330. A 1-to-4 expansion 1330 is then used to generate all 256 post-correlation ICI bias These post-correlation ICI bias are then subtracted from the corresponding 256 correlator outputs of block 1350. To implement this receiver architecture, 64 complex convolution 1340 and complex codeword correlator 1330 need to be performed independently.

In yet another embodiment in FIG. 14 of Webster, for each and every codeword (256 codewords in total), two basic building blocks (which have the same functions described above) are also required: (i) one DFE convolution block 1440 and (ii) one complex codeword correlator 1430. Webster states the fact that the DFE taps can be pre-calculated and pre-stored. Again, the 256 ICI outputs are calculated independently at blocks 1440, and then 256 correlations are found at the outputs of block 1430.

In summary, Webster's architecture requires a chip-based DFE for cancellation of ISI from the previous symbol. To mitigate the ICI distortion due to the present CCK symbol, significant hardware complexity and the execution of large numbers of complex operations (complex multiplications and additions that are required for complex convolution and complex correlation) are needed. As a result, large power consumption, complex hardware, and long processing times will be required to implement the embodiments described in FIGS. 12–14 of Webster.

In U.S. application Ser. No. 10/289,749, filed Nov. 7, 2002 and entitled "Packet-based Multiplication-free CCK Demodulator with a Fast Multipath Interference Cipher", the present inventors describe a receiver that is provided with an innovative Fast Multipath Interference Cipher (FMIC) to mitigate ICI. As shown in FIG. 2 of Ser. No. 10/289,749, the ICIs for all 256 CCK codewords can be jointly and effectively computed by an innovative FMIC block in a first operation mode (Mode 1). In a separate operation mode (Mode 2), the corresponding ICIs are subtracted from the CCK correlator outputs in the CCK decoder block. This FMIC block implements a Fast Multipath Transform (FMT) having a structure similar to a CCK correlator, which computes the CCK codeword correlations jointly and effectively using the Fast Walsh Transform (FWT). Although the receiver proposed in Ser. No. 10/289,749 can successfully mitigate ICI due to multipath propagations with essentially no additional hardware, it (and in particular, the FMIC) does not mitigate the ISI due to multipath propagation.

SUMMARY OF THE DISCLOSURE

It is an object of the present invention to provide a CCK receiver which successfully mitigates both ISI and ICI.

It is another object of the present invention to provide a CCK receiver which mitigates both ISI and ICI while minimizing the number of complex operations.

It is yet another object of the present invention to provide a CCK receiver which mitigates both ISI and ICI while simplifying the hardware for a CCK receiver.

In order to accomplish the objects of the present invention, there is provided a method for mitigating the multipath interference experienced by a present CCK symbol. This method first obtains a set of initial candidates for the present CCK symbol and a set of initial candidates for the next CCK symbol based on the ICI-corrected correlation outputs for the present and next CCK symbols, respectively. The method then obtains, for each of the candidates for the present CCK symbol, first ISI-mitigated correlation outputs where both the ICI due to the present CCK symbol and the ISI due to the next CCK symbol have been corrected. Thereafter, for each of the candidates for the present CCK symbol, and based on the first ISI-mitigated correlation outputs, the method obtains second ISI-mitigated correlation outputs where the ISI due to the previous CCK symbol has also been corrected. The present CCK symbol is then decoded based on the second ISI-mitigated correlation outputs.

The present invention also provides a RAKE receiver employable in a multipath environment, the receiver receiving Complementary Code Keying (CCK) symbols that include a present CCK symbol, a previous CCK symbol, and a next CCK symbol. The receiver has a channel estimation block for determining a channel impulse response based on the present CCK symbol, and an FMIC bias computation block that receives feedback tap weights and feed-forward tap weights from the channel estimation block for calculating a plurality of multipath interference (MPI) biases which is a post-correlation representation of ICI for the present CCK symbol. The receiver also includes a channel matched filter (CMF) that receives the CMF tap weights from the channel estimation block, and a CCK correlator that receives the output of the channel matched filter and which generates correlation outputs. The receiver further includes a decoder which (i) receives the plurality of MPI biases from the FMIC bias computation block for mitigating the ICI from the present CCK symbol, (ii) receives the FF tap weights and FB tap weights from the channel estimation block that are used to compute the MPI biases due to the previous CCK symbol and the next CCK symbol, and (iii) receives the correlation outputs from the CCK correlator for mitigating the ICI from the present CCK symbol, and the ISI from the next CCK symbol and the previous CCK symbol.

BRIEF DESCRIPTION OF THE DRAWINGS

FIGS. 6 and 7 illustrate an example that is carried out according to the method of the present invention.

DETAILED DESCRIPTION OF THE PREFERRED EMBODIMENTS

The following detailed description is of the best presently contemplated modes of carrying out the invention. This description is not to be taken in a limiting sense, but is made merely for the purpose of illustrating general principles of embodiments of the invention. The scope of the invention is best defined by the appended claims. In certain instances, detailed descriptions of well-known devices, components, mechanisms and methods are omitted so as to not obscure the description of the present invention with unnecessary detail.

Figure 1:
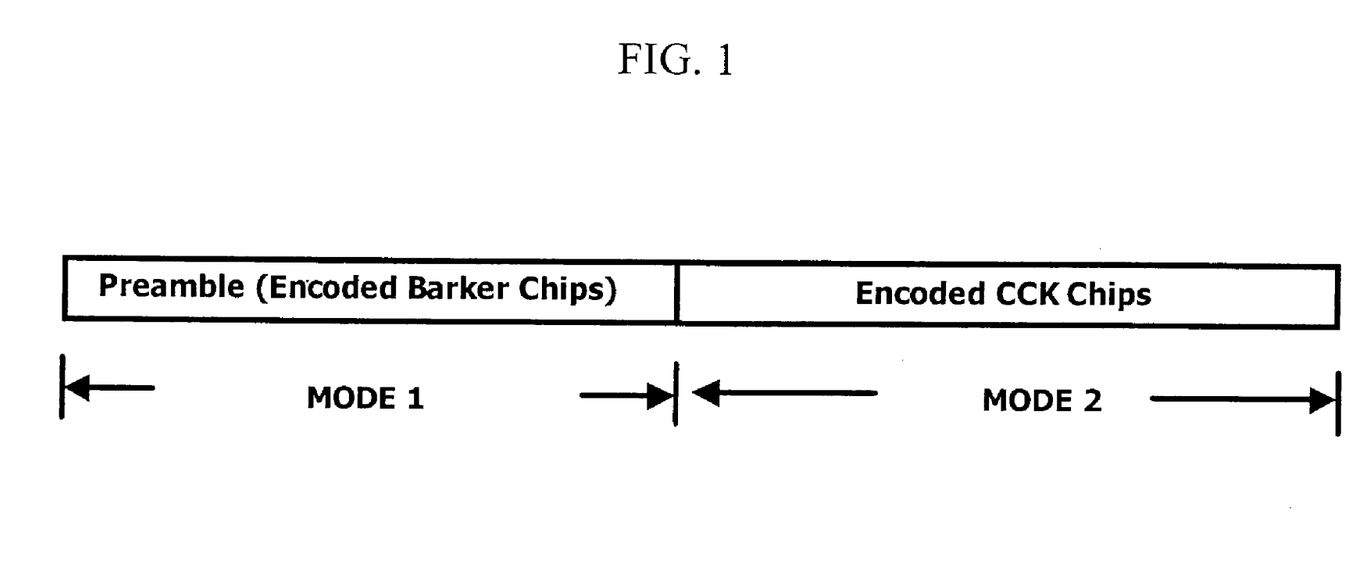
FIG. 1 illustrates an 802.11b packet format.

802.11b is a wireless local area network (WLAN) standard. A simplified 802.11b packet format is shown in FIG. 1 and contains two modes of operation. The preamble and header of a packet (Mode 1) is Barker-coded and the data portion (Mode 2) is modulated in Complementary Code Keying (CCK) to provide encoded CCK chips. Since the two modes are not operating at the same time, the hardware can be shared in Modes 1 and 2 to reduce hardware complexity.

Figure 2:
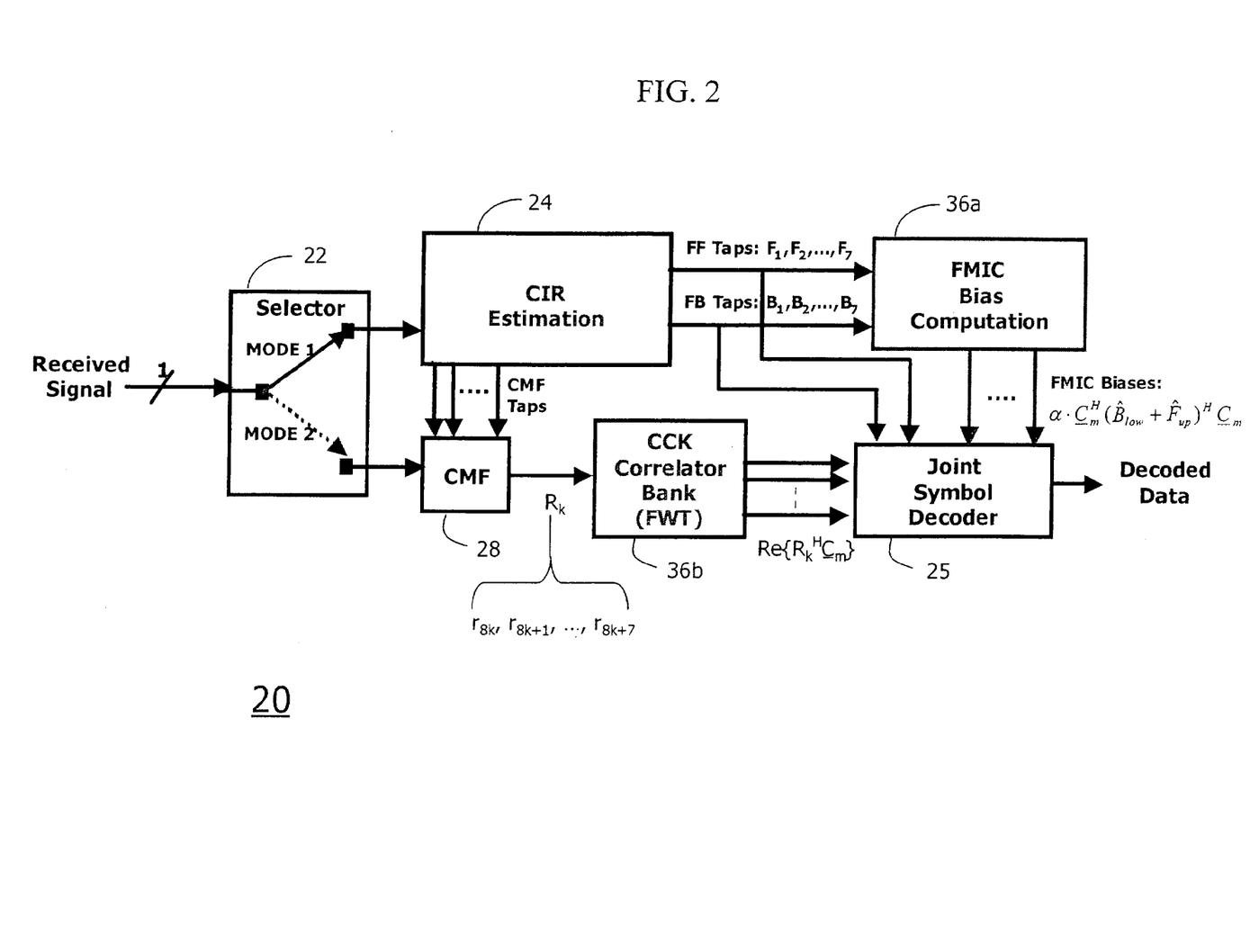
FIG. 2 illustrates a receiver according to one embodiment of the present invention.

FIG. 2 illustrates a receiver 20 according to the present invention. In what follows, a functional description of each block of the receiver 20 will be first presented.

An 802.11b transmitter transmits a data packet at a time for the receiver 20 to process. When a CCK modulated packet is transmitted, each group of 8 data bits is CCK encoded to 8 complex chips (called one CCK symbol or one CCK codeword) that are transmitted sequentially on a chip-by-chip basis by the 802.11b transmitter. This signal travels through a wireless channel and arrives at an 802.11 receiver such as receiver 20. A typical wireless channel is characterized by multipath propagation which distorts the received signal. This multipath propagation and its problems will be described in connection with FIG. 5 hereinbelow. Thus, it is important to implement a cost-effective and performance-effective receiver which can mitigate the multipath distortion.

The receiver 20 has a selector block 22, a CIR estimation block 24, an FMIC bias computation block 36a, a CMF (channel matching filter) block 28, a CCK correlator block 36b, and a joint symbol decoder block 25. The selector block 22 routes a received signal to one of two paths. The selector 22 connects the first path (Mode 1) during preamble processing and connects the second path (Mode 2) when decoding the received CCK symbols.

The CIR estimation block 24 has inputs coupled to the selector 22, and outputs coupled to the FMIC bias computation block 36a, the CMF block 28, and the joint symbol decoder block 25. During the Mode 1 operation, the CIR estimation block 24 uses Barker code correlation to determine an estimated "channel impulse response" (CIR, also known as "multipath intensity profile"). The CIR Estimation block 24 assumes that the channel impulse response remains unchanged during the period of a packet and works in Mode 1 during preamble processing for each packet. One set of outputs of the CIR estimation block 24 is the CMF tap weights. In Chapter 14 of *Digital Communications,* Fourth Edition, J. G. Proakis, McGraw Hill, N.Y., 1995 (hereinafter referred to as "Proakis"), it is shown that the optimum CMF tap weights can be easily derived from the estimated channel impulse response. To simplify hardware, one can also use a threshold criterion to eliminate paths with negligible energy. Another set of outputs of the CIR estimation block 24 are the Feedback (FB) tap weights (denoted as $B_1, B_2, \ldots, B_7$ hereinbelow) and Feed-forward (FF) tap weights (denoted as $F_1, F_2, \ldots, F_7$ hereinbelow) corresponding to the post-and pre-cursor parts, respectively, of the composite channel impulse response including the CMF. These tap weights are used by (i) the FMIC bias computation block 36a to compute the FMIC biases for the joint symbol decoder block 25, and (ii) the joint symbol decoder block 25 to evaluate the MultiPath Interferences (MPI) due to the past and the next CCK symbols.

In Mode 1, the FMIC bias computation block 36a performs the same function as the FMIC block 36a in Ser. No. 10/289,749. The FMIC bias computation block 36a of the present invention can also have the same structure as the various FMIC blocks illustrated in Ser. No. 10/289,749. During Mode 1, the FMIC bias computation block 36a of the present invention uses the FB and FF taps provided by the CIR Estimation 24 as inputs to jointly and effectively calculate 64 (or 32, or 16, or 8) Multipath Interferences (MPIs). These FMIC biases are used in Mode 2 by the joint symbol decoder block 25 to provide effective ICI cancellation, as described below. The MPIs provided by the FMIC Bias Computation 36a are a post-correlation representation of the ICI due to the currently received CCK symbol (8 chips long). The multipath profile is assumed to be unchanged during a packet period. Therefore, the MPIs are calculated only once for each packet in Mode 1. These MPIs, denoted as $\alpha \cdot ICI_m = \alpha \cdot \underline{C}_m^H(\hat{B}_{low} + \hat{F}_{up})^H \underline{C}_m$ (m=0, 1, 2, ..., 255) hereinbelow, will be used later in Mode 2 when the Joint Symbol Decoder 25 cancels out the effect of the ICI by subtracting the corresponding MPI values from the outputs of the CCK correlator block 36b. As with the receiver in Ser. No. 10/289,749, the same hardware can be used to implement the FMIC Bias Computation 36a in Mode 1 and the CCK Correlator block 36b in Mode 2. In other words, the same hardware can be "shared", or used to perform two different functions at two different times.

Figure 5:
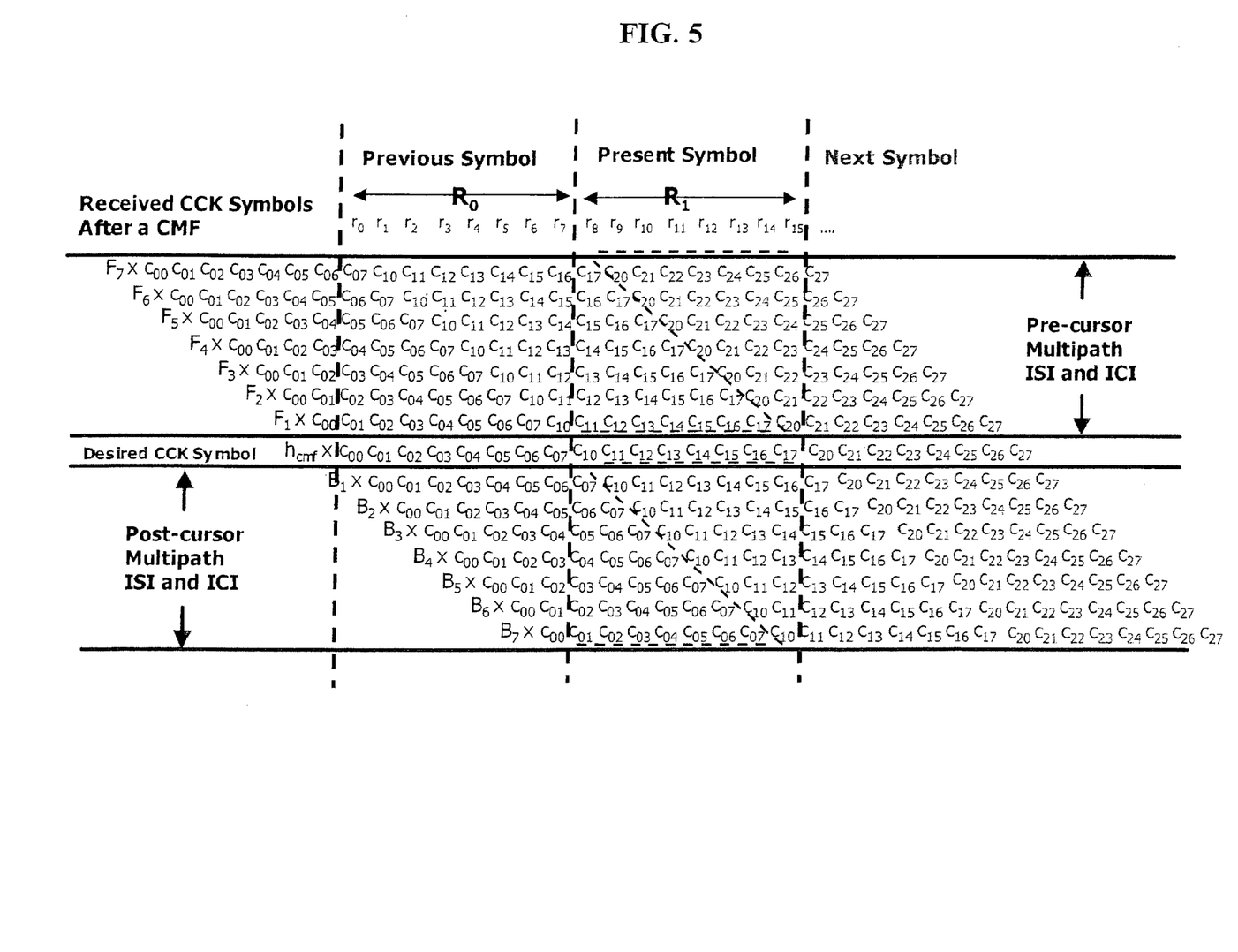
FIG. 5 illustrates all the multipath components within a received signal after the RAKE.

During Mode 2 operation, the CMF block 28 uses the CMF tap weights provided by the CIR estimation block 24 to coherently combine the energy of the received signal through a multipath channel. In FIG. 2, the output of the CMF is denoted as $R_k$. Each $R_k$ consists of eight received chips $[r_{8k}, r_{8k+1}, r_{8k+2}, r_{8k+3}, r_{8k+4}, r_{8k+5}, r_{8k+6}, r_{8k+7}]$ for the k-th CCK codeword. A detailed description of what constitutes $R_k$ in a multipath channel, as shown in FIG. 5, will be described in connection with FIG. 5 below.

A CCK codeword contains 8 CCK chips, as specified by IEEE Standards 802.11b, 1999. In what follows, $\underline{C} = \{\underline{C}_m, m=0, 1, \ldots, 255\}$ will be used to denote the CCK codebook, and $\underline{C}_m$ will be used to denote the m-th CCK codeword in the CCK codebook. Let $C_k$ denote the k-th transmitted CCK codeword:

$$C_k = [C_{k0}, C_{k1}, C_{k2}, C_{k3}, C_{k4}, C_{k5}, C_{k6}, C_{k7}],$$

where each CCK chip $c_{ki}$ (i=0, 1, ... 7) is a QPSK modulated complex number from $\{1, e^{j\pi/2}, e^{j\pi}, e^{j3\pi/2}\}$ (or $\{e^{j\pi/4}, e^{j3\pi/4}, e^{j5\pi/4}, e^{j7\pi/4}\}$), the first index k indicates the time sequence of transmission, and the second index i indicates the i-th CCK chip in one CCK codeword. $C_k$ is one of the $\underline{C}_m$'s from the CCK codebook. When an 802.11b transmitter operates at 11 Mbps mode, eight data bits are grouped together to determine the transmitted CCK codeword. The binary representation of these eight bits is used to determine the index of the transmitted CCK codeword. For example, the eight data bits 10000001 (binary representation for 129) will be encoded to $\underline{C}_{129}$ for transmission. The objective of an 802.11b receiver is to decode the eight data bits correctly.

The CCK Correlator 36b applies the Fast Walsh Transform (FWT) to the received chips $R_k$ (8 chips at a time) to calculate the correlations of the eight received chips and 64 of 256 CCK codewords. These 64 outputs can be easily extended to obtain all 256 CCK correlations, denoted as $R_k^H \underline{C}_m$ (m=0, 1, ..., 255) in Equation (2) below (also shown in FIG. 2). The CCK Correlator 36b of the present invention can also have the same structure as the various CCK Correlators 36b illustrated in Ser. No. 10/289,749.

FIG. 2 of the present invention illustrates the FMIC bias computation 36a and the CCK Correlator 36b as being separate components. In practical implementation, these two blocks 36a and 36b can indeed be separate components, or can share the same hardware as illustrated in Ser. No. 10/289,749.

Finally, the joint symbol decoder block 25 takes $R_k^H \underline{C}_m$ (m=0, 1, ..., 255) and the pre-computed FMIC biases as inputs, and uses Algorithms 1 and 2 (described below) to decode the CCK symbols jointly. The decoded data is the output of the joint symbol decoder block 25 and represents the output of an 802.11b receiver.

Before a complete description of this joint symbol decoder block 25 is provided, a mathematical model characterizing the multipath propagation channel is first given below. It will be seen that a joint symbol decoder is the optimal decoder for such a propagation channel.

With signals reflected off walls, furniture, human beings, and a myriad of other objects, multipath propagation often exists between a pair of WLAN devices, such as a transmitter and a receiver. At an 802.11b receiver, a CCK signal that is transmitted through multipath propagation will result in the reception of multiple copies of the transmitted signal with various time delays and strengths. If not properly mitigated, these "echoes" will in turn cause degraded receiver performance and result in unacceptable quality and/or reduced transmission ranges.

Figure 3:
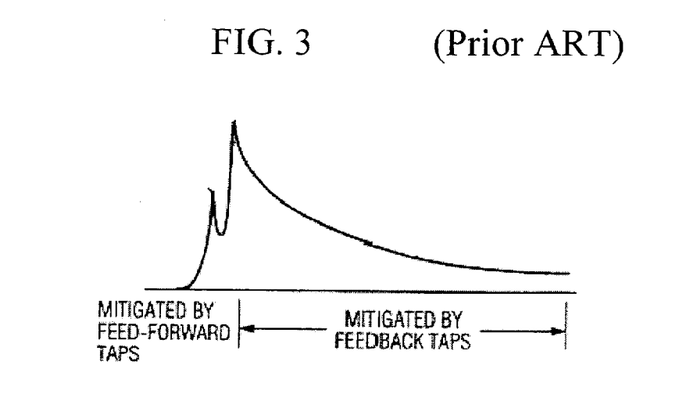
FIG. 3 illustrates a conventional multipath intensity profile (also known as channel impulse response) for a multipath propagation channel.
Figure 4:
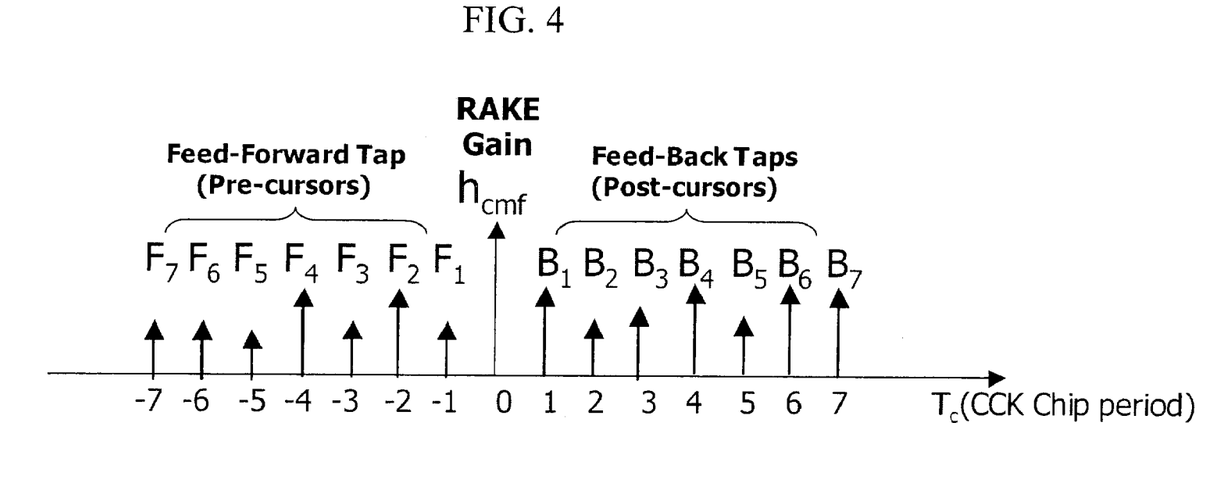
FIG. 4 illustrates a composite channel impulse response (CIR) after the RAKE.

To enhance the signal-to-noise ratio in a multipath propagation environment, a Channel Matched Filter (CMF) such as 28 is often used. It is also commonly known as a RAKE receiver. The CMF 28 is implemented with its optimal tap weights derived from the CIR estimation block 24. The estimated composite channel impulse response at the output of a CMF 28 is the convolution of the estimated channel impulse response from the CIR estimation block 24 and the tap weights of the CMF 28. At the output of a CMF 28, a multipath combining gain, $h_{cmf}$, can be realized, according to Proakis. A typical WLAN multipath intensity profile can be found in FIG. 3, which is reproduced from FIG. 9 of Webster. The profile has a shorter pre-cursor and a longer post-cursor. After the RAKE (CMF), a typical estimated composite channel impulse response, including the RAKE, has a pre-cursor and post-cursor of approximately the same length, which is illustrated in FIG. 4. $F_i$'s and $B_i$'s, with i to indicate relative path delays in CCK chips, denote the complex gain values of different pre-cursor and post-cursor paths, respectively. The desired signal resides at the center of this composite channel impulse response and receives a processing gain $h_{cmf}$ from the RAKE.

FIG. 5 of the present disclosure shows the multipath problem to be addressed. There are three types of multipath interferences to the decoding of a given symbol: (i) ISI from the previous symbol, (ii) ICI from the current symbol, and (iii) ISI from the next symbol. A typical 802.11b WLAN communication occurs with a transmitter and a receiver located within a couple of hundred feet from each other. A typical transmitter sends its signal via an antenna. This signal then travels in a multipath propagation environment before reaching the desired receiver. Among all the received paths, it is very unlikely for one path, with many reflections, to have a total traveling distance over 700 ft and to remain strong enough to be detected. Given that a CCK symbol is about 727 ns long, we can safely assume that the multipath interference comes from the present CCK symbol itself and two adjacent CCK symbols only. FIG. 5 illustrates all multipath interference components.

In FIG. 5, it is assumed that three CCK symbols, #0 (previous symbol), #1 (current symbol), and #2 (next symbol), are transmitted in sequence through a multipath environment and received at the CCK receiver 20. Each row in FIG. 5 represents a particular path and each column is a particular instance of time. The first subscript of C is the CCK codeword (symbol) number and the second subscript is the index of the chip within the CCK codeword. The received chip samples at the output of the CMF block 28, $r_k$, are the weighted column sums with the pre-cursor weights $F_i$'s and the post cursor weights $B_i$'s derived from the composite channel impulse response. For example, reading the column headed by $r_8$, and referring to FIG. 4:

$$r_8 = F_7 c_{17} + F_6 c_{16} + F_5 c_{15} + F_4 c_{14} + F_3 c_{13} + F_2 c_{12} + F_1 c_{11} + h_{cmf} c_{10} + B_1 c_{07} + B_2 c_{06} + B_3 c_{05} + B_4 c_{04} + B_5 c_{03} + B_6 c_{02} + B_7 c_{01}$$

At the output of the CMF 28, if one looks at each received chip $r_k$ of the CCK symbol #1, there are one desired signal (see the line designated "Desired CCK Symbol" in FIG. 5) and up to 14 multipath interference components: seven pre-cursor (see the lines "Pre-cursor Multipath ISI and ICI" in FIG. 5), and seven post-cursor (see the lines "Post-cursor Multipath ISI and ICI" in FIG. 5) interferences from the previous (symbol #0), the present (symbol #1), and the next (symbol #2) CCK symbols.

Assuming the additive noise is negligible, a matrix equation describing all the signal and multipath interference components shown in FIG. 5 can be given by $$R_1 = B_{up} C_0 + H_{BhF} C_1 + F_{low} C_2$$

where the received symbol $R_1$ and the three transmitted symbols (the previous symbol $C_0$, the present symbol $C_1$, and the next symbol $C_2$) are given by $$R_1 = [r_8, r_9, r_{10}, r_{11}, r_{12}, r_{13}, r_{14}, r_{15}]^T$$

$$C_0 = [c_{00}, c_{01}, c_{02}, c_{03}, c_{04}, c_{05}, c_{06}, c_{07}]^T$$

$$C_1 = [c_{10}, c_{11}, c_{12}, c_{13}, c_{14}, c_{15}, c_{16}, c_{17}]^T$$

$$C_2 = [c_{20}, c_{21}, c_{22}, c_{23}, c_{24}, c_{25}, c_{26}, c_{27}]^T,$$

respectively. The Multipath Interference (MPI) from the previous and the next symbols are characterized by $B_{up}$ and $F_{low}$ as follows:

$$B_{up} = \begin{bmatrix} 0 & B_7 & B_6 & B_5 & B_4 & B_3 & B_2 & B_1 \\ 0 & 0 & B_7 & B_6 & B_5 & B_4 & B_3 & B_2 \\ 0 & 0 & 0 & B_7 & B_6 & B_5 & B_4 & B_3 \\ 0 & 0 & 0 & 0 & B_7 & B_6 & B_5 & B_4 \\ 0 & 0 & 0 & 0 & 0 & B_7 & B_6 & B_5 \\ 0 & 0 & 0 & 0 & 0 & 0 & B_7 & B_6 \\ 0 & 0 & 0 & 0 & 0 & 0 & 0 & B_7 \\ 0 & 0 & 0 & 0 & 0 & 0 & 0 & 0 \end{bmatrix};$$

$$F_{low} = \begin{bmatrix} 0 & 0 & 0 & 0 & 0 & 0 & 0 & 0 \\ F_7 & 0 & 0 & 0 & 0 & 0 & 0 & 0 \\ F_6 & F_7 & 0 & 0 & 0 & 0 & 0 & 0 \\ F_5 & F_6 & F_7 & 0 & 0 & 0 & 0 & 0 \\ F_4 & F_5 & F_6 & F_7 & 0 & 0 & 0 & 0 \\ F_3 & F_4 & F_5 & F_6 & F_7 & 0 & 0 & 0 \\ F_2 & F_3 & F_4 & F_5 & F_6 & F_7 & 0 & 0 \\ F_1 & F_2 & F_3 & F_4 & F_5 & F_6 & F_7 & 0 \end{bmatrix}$$

In the meantime, the received signal also contains the ICI (i.e., multiple images of the present CCK symbol #1 due to multipath propagation). A matrix characterizing the overall multipath effects for CCK symbol #1 is given by $$H_{BhF} = \begin{bmatrix} h_{cmf} & F_1 & F_2 & F_3 & F_4 & F_5 & F_6 & F_7 \\ B_1 & h_{cmf} & F_1 & F_2 & F_3 & F_4 & F_5 & F_6 \\ B_2 & B_1 & h_{cmf} & F_1 & F_2 & F_3 & F_4 & F_5 \\ B_3 & B_2 & B_1 & h_{cmf} & F_1 & F_2 & F_3 & F_4 \\ B_4 & B_3 & B_2 & B_1 & h_{cmf} & F_1 & F_2 & F_3 \\ B_5 & B_4 & B_3 & B_2 & B_1 & h_{cmf} & F_1 & F_2 \\ B_6 & B_5 & B_4 & B_3 & B_2 & B_1 & h_{cmf} & F_1 \\ B_7 & B_6 & B_5 & B_4 & B_3 & B_2 & B_1 & h_{cmf} \end{bmatrix} =$$

$$B_{low} + h_{cmf} I + F_{up}$$

where the MPI from the post-cursors and pre-cursors of the present symbol are characterized by the $B_{low}$ and $F_{up}$ matrices as follows:

$$B_{low} \equiv \begin{bmatrix} 0 & 0 & 0 & 0 & 0 & 0 & 0 & 0 \\ B_1 & 0 & 0 & 0 & 0 & 0 & 0 & 0 \\ B_2 & B_1 & 0 & 0 & 0 & 0 & 0 & 0 \\ B_3 & B_2 & B_1 & 0 & 0 & 0 & 0 & 0 \\ B_4 & B_3 & B_2 & B_1 & 0 & 0 & 0 & 0 \\ B_5 & B_4 & B_3 & B_2 & B_1 & 0 & 0 & 0 \\ B_6 & B_5 & B_4 & B_3 & B_2 & B_1 & 0 & 0 \\ B_7 & B_6 & B_5 & B_4 & B_3 & B_2 & B_1 & 0 \end{bmatrix};$$

$$F_{up} = \begin{bmatrix} 0 & F_1 & F_2 & F_3 & F_4 & F_5 & F_6 & F_7 \\ 0 & 0 & F_1 & F_2 & F_3 & F_4 & F_5 & F_6 \\ 0 & 0 & 0 & F_1 & F_2 & F_3 & F_4 & F_5 \\ 0 & 0 & 0 & 0 & F_1 & F_2 & F_3 & F_4 \\ 0 & 0 & 0 & 0 & 0 & F_1 & F_2 & F_3 \\ 0 & 0 & 0 & 0 & 0 & 0 & F_1 & F_2 \\ 0 & 0 & 0 & 0 & 0 & 0 & 0 & F_1 \\ 0 & 0 & 0 & 0 & 0 & 0 & 0 & 0 \end{bmatrix},$$

and the desired signal within R can be characterized as an 8-by-8 identity matrix with a real-valued CMF gain, $h_{cmf}$.

In general, the received signal $R_k$ used to decode the present symbol $C_k$ can be characterized as $$R_k = [r_{8k}, r_{8k+1}, r_{8k+2}, r_{8k+3}, r_{8k+4}, r_{8k+5}, r_{8k+6}, r_{8k+7}] =$$
$$B_{up} C_{k-1} + H_{BhF} C_k + F_{low} C_{k+1} = B_{up} C_{k-1} + B_{low} C_k +$$
$$h_{cmf} C_k + F_{up} C_k + F_{low} C_{k+1} \quad \text{Eq. (1)}$$

In the actual receiver implementation, a Channel Impulse Response (CIR) estimation block 24 is used to provide an estimate for the multipath intensity profile characterized by ($B_{up}$, $H_{BhF}$, $F_{low}$) or ($B_{up}$, $B_{low}$, $h_{cmf}$, $F_{up}$, $F_{low}$). In what follows, $\hat{B}_{up}$, $\hat{B}_{low}$, $\hat{H}_{BhF}$, $\hat{h}_{cmf}$, $\hat{F}_{up}$, and $\hat{F}_{low}$ will be used to represent estimates for $B_{up}$, $B_{low}$, $H_{BhF}$, $h_{cmf}$, $F_{up}$, and $F_{low}$, respectively.

Referring to the columns designated by "Present Symbol" in FIG. 5, four MPI components can be identified. Each MPI component is shaped as a triangle (with dotted lines showing the boundaries). There is a first triangle which represents the ISI from the previous symbol (see all CCK symbols C where the first subscript is 0), second and third triangles which represent the ICI from the present symbol (see all CCK symbols C where the first subscript is 1), and a fourth triangle which represents the ISI from the next symbol (see all CCK symbols C where the first subscript is 2).

In summary, a complete mathematical model is presented above to characterize the multipath propagation channel encountered in a typical WLAN environment. Thus, one can observe that when decoding a CCK symbol, an optimal CCK symbol decoder needs to take into consideration all the multipath interferences (MPI) from two adjacent CCK symbols and the CCK symbol itself.

The present invention provides a low-complexity, near-optimum joint symbol decoder which uses data from consecutively-received symbols to jointly decode each CCK symbol. The receiver 20 in FIG. 2 of the present invention has a CCK correlator block 36b which takes the output of a RAKE receiver or CMF 28 ($R_k$ in Equation (1) and FIG. 2) as its input, and obtains the correlations between the received signal $R_k$ and all potential CCK codewords $\underline{C}_m$ (m=0, 1, . . . 255):

$$R_k^H \underline{C}_m = (B_{up}C_{k-1} + B_{low}C_k + h_{cmf}C_k + F_{up}C_k + F_{low}C_{k+1})^H \underline{C}_m \quad \text{Eq. (2)}$$

where $\{\}^H$ denotes the hermitian function (also known as the "complex transpose" function). The joint symbol decoder block 25 then takes the multipath-interference contaminated correlation outputs $R_k^H \underline{C}_m$ (m=0, 1, 2, . . . 255), the FF and FB tap weights computed in the CIR estimation block 24, and the pre-calculated FMIC values from the FMIC Bias Computation block 36a (obtained during Mode 1) as inputs, and performs joint symbol MPI cancellations to obtain near-optimum decoding results.

To fully appreciate the present invention, it is necessary to first point out that the major challenge in implementing a joint symbol decoder resides in its complexity. While decoding the k-th transmitted CCK codeword $C_k$, the desired signal is represented by $$(h_{cmf}C_k)^H \underline{C}_m$$

in each of the 256 correlation outputs. The desired signal is a real number for the correct CCK codeword (when $C_k = \underline{C}_m$). It is observed that Equation (2) is actually a complex number operation. When implementing a receiver, one can ignore all the imaginary parts and compute only the real parts for the desired signal and all the MPI terms in Equation (2) to save hardware. In what follows, it will not be specifically mentioned when one can compute only the "real part" of the desired signal or MPI terms to save hardware. One skilled in the art can easily tell when a simplified implementation is possible considering the "real part" operation only. At the output of this correlator block 36b, the multipath interference distortions are represented by:

(a) ISI from the previous codeword $C_{k-1}$: $(B_{up}C_{k-1})^H \underline{C}_m$
(b) ICIs from the present codeword $C_k$: $(B_{low}C_k + F_{up}C_k)^H \underline{C}_m$
(c) ISI from the next codeword $C_{k+1}$: $(F_{low}C_{k+1})^H \underline{C}_m$ For the multipath distortion due to the past CCK symbol in (a) above, one can use $\hat{B}_{up}$ and $\hat{C}_{k-1}$ to estimate the multipath distortion due to the past CCK symbol for each potential present codeword $\underline{C}_m$. If the $\hat{B}_{up}$ is close to $B_{up}$ and the past symbol is correctly decoded (i.e., $\hat{C}_{k-1} = C_{k-1}$), then one can effectively cancel this multipath distortion by subtracting $(\hat{B}_{up}\hat{C}_{k-1})^H \underline{C}_m$ from the m-th CCK correlator output.

To represent the multipath distortion due to the present symbol (ICI) in (b) above, one can use the following estimated ICI biases:

$$ICI_m = \underline{C}_m^H (\hat{B}_{low} + \hat{F}_{up})^H \underline{C}_m,$$

where m=0, 1, 2, . . . , 255, for each of the 256 candidate CCK codewords indexed by m. One observes that the ICI bias shown in (b) above is not the same as the estimated ICI biases above, while the ICI bias shown in (b) has a $C_k$ and a $\underline{C}_m$. The estimated ICI biases have two $\underline{C}_m$'s Note that $C_k$ is yet to be decoded. The above estimated ICI biases are, therefore, an approximation because the present CCK symbol ($C_k$) can only be one of the 256 CCK codewords ($\underline{C}_m$). Thus, the estimated ICI biases are only correct for the correct present CCK symbol. For any other of the 255 CCK symbols, the distortion can be increased when the estimated ICI bias is applied at the corresponding correlation output of the CCK correlator 36b. When one needs to keep a receiver simple, this kind of multipath distortion can, therefore, only be mitigated. To provide the best mitigation effect, one can apply the following soft bias:

$$\alpha \cdot ICI_m = \alpha \cdot \underline{C}_m^H (\hat{B}_{low} + \hat{F}_{up})^H \underline{C}_m$$

where $0 \leq \alpha \leq 1$. The best value for $\alpha$ can be found using computer simulation.

For the same reason, the multipath distortion due to the next CCK symbol ($C_{k+1}$) in (c) above can also only be mitigated. One can apply the following soft bias to mitigate the multipath interference due to the next CCK symbol ($C_{k+1}$):

$$\beta \cdot \underline{C}_m^H \hat{F}_{low}^H \underline{C}_m$$

where $0 \leq \beta \leq 1$. The best value for $\beta$ can also be found using computer simulation.

In summary, when decoding the k-th transmitted CCK codeword $C_k$:

1) MPI distortion (a) can be removed with estimates of the FB taps and the previous codeword $C_{k-1}$.
2) MPI distortion (b) can be mitigated with estimates of the FB and FF taps.
3) MPI distortion (c) can be mitigated with estimates of the FF taps and the next codeword $C_{k+1}$.

In order to have the best system performance, one would ideally mitigate all three MPI distortions represented by the four triangles in FIG. 5. This requires estimates of the FB and FF taps, and estimates of the previous and the next codewords. In general, when considering the decoding of a codeword $C_k$, one can assume that the previous codeword $C_{k-1}$ has already been decoded, and that one needs to have estimate(s) for the next codeword $C_{k+1}$. Therefore, the k-th codeword can be optimally decoded based upon 256 correlator outputs ($R_k^H \underline{C}_m$), multipath channel characteristics ($\hat{B}_{up}$, $\hat{B}_{low}$, $\hat{F}_{up}$, and $\hat{F}_{low}$), the decoded previous codeword ($\hat{C}_{k-1}$), and estimates of the next received codeword. Here, it should be noted that one CCK codeword delay is required to obtain the estimate(s) of the next CCK codeword in order to make a decision regarding the present CCK codeword.

Since there are 256 CCK codeword candidates, one can imagine a joint symbol decoder which requires the evaluation of the likelihood of all 65536 (=$256^2$) present and next codeword combinations before performing the final decoding of the present CCK codeword $C_k$. This huge number of combinations makes it impractical to implement such a joint decoder. It is, therefore, desirable to have a low-complexity joint decoder which can effectively mitigate all MPI distortions without having to evaluate all 65536 codeword combinations.

The near-optimum, low-complexity joint symbol decoder block 25 will now be described. The gist of this joint symbol decoder 25 resides in finding $M_k$ (with $M_k$ much smaller than 256) initial estimates for the present codeword $C_k$, and $M_{k+1}$ (with $M_{k+1}$ much smaller than 256) initial estimates for the next codeword $C_{k+1}$, before applying the joint decoding. Hence, only $M_k M_{k+1}$ combinations need to be evaluated for the joint symbol decoder 25 to make a decision on codeword $C_k$. This reduced number of combinations allows for the receiver 20 to be easily implemented, and also provides superb performance as all MPI distortions (i.e., the four triangles) can be either removed or mitigated.

The joint symbol decoder block 25 consists of hardware to execute Algorithms #1 and #2 described below in sequence to jointly and effectively decode the transmitted CCK symbols in the presence of multipath interferences. One skilled in the art can easily implement the joint symbol decoder based on the descriptions on Algorithms #1 and #2 below. Algorithm #1 below describes means to obtain initial estimates for the present and next CCK codewords $C_k$ and $C_{k+1}$.

Algorithm #1: Obtaining Initial Estimates for the k-$^{th}$ and and k+1-$^{th}$ transmitted CCK codewords $C_k$ and $C_{k+1}$:
Required Inputs:
(a) Inputs from the CCK Correlator block 36b: $R_k^H \underline{C}_m$ (m=0, 1, 2, ... 255) and $R_{k+1}^H \underline{C}_m$.
(b) Inputs from the FMIC bias computation block 36a: $\alpha \cdot ICI_m = \alpha \cdot \underline{C}_m^H (\hat{B}_{low} + \hat{F}_{up})^H \underline{C}_m$:

The FMIC bias computation block 36a (which can be the same as block 36a in Ser. No. 10/289,749) is used to effectively pre-compute these MPI outputs for each CCK codeword (indexed by m) with an optimal $\alpha$ determined by computer simulation. $\alpha$ is a number between 0 and 1. These MPI outputs represent the estimated ICI biases due to the present CCK codeword. The MPI outputs are computed only once per packet during the pre-amble portion of a packet and saved for all 256 CCK codeword.

Step1: Based on the correlator outputs $R_k^H \underline{C}_m$ from the CCK Correlator Block 36b, use the pre-computed ICI biases from the FMIC bias computation block 36a to obtain ICI-corrected correlation outputs for the k-th transmitted (i.e., present) codeword (or symbol). In particular, for each of the 256 correlator outputs (indexed by m), subtract the corresponding MPI, $\alpha \cdot ICI_m$ from the CCK correlation output $R_k^H \underline{C}_m$ to obtain the ICI-corrected correlation outputs for the k-th transmitted codeword. To implement this step, it is possible to use the symmetry properties of the CCK codewords and the MPI bias to reduce the number of bias subtractions from 256 to 32, or 16 as described in Ser. No. 10/289,749 and still achieve equivalent performance.

Step 2: Among the 256 ICI-corrected correlation outputs obtained in Step 1, select the $M_k$ CCK codewords whose ICI-corrected correlation outputs are the $M_k$ greatest. These $M_k$ CCK codewords, denoted as $\hat{C}_{k,i}$ (i=1, 2, ..., $M_k$), are the initial estimates for the present CCK codeword $C_k$. For the convenience of the descriptions below, let $P_{k,i}$ represent the corresponding ICI-corrected correlation outputs for $\hat{C}_{k,i}$ (i=1, 2, ..., $M_k$).

Step 3: After a delay, when the correlator outputs $R_{k+1}^H \underline{C}_m$ become available for the next (k+1-$^{th}$) CCK codeword or symbol, repeat Step 1 above to obtain the ICI-corrected correlation outputs for the k+1-$^{th}$ transmitted symbol, and repeat Step 2 above to obtain the $M_{k+1}$ initial estimates for the next CCK codeword $C_{k+1}$, denoted as $\hat{C}_{k+1,j}$ (j=1, 2, ..., $M_{k+1}$). For the convenience of the descriptions below, let $P_{k+1,j}$ represent the corresponding ICI-corrected correlation outputs for $\hat{C}_{k+1,j}$ (j=1, 2, ..., $M_{k+1}$).

End of Algorithm #1

Note that in Step 1 above, MPI distortions due to the CCK symbol itself (i.e., the ICI) have been mitigated from the correlation outputs. This is why one can effectively determine $M_k$ or $M_{k+1}$ initial estimates in Step 2.

With the initial estimates obtained by Algorithm #1 for the present and next CCK symbols, one is ready to perform the joint symbol decoding using Algorithm #2. Let $\hat{C}_{k-1}$ denote the decoded CCK codeword $C_{k-1}$. For each of the $M_k$ initial estimates for the present CCK symbol, there are $M_{k+1}$ initial estimates for the next CCK symbol. One needs to evaluate these $M_k M_{k+1}$ candidates and determine the present CCK symbol.

Algorithm #2: Joint Symbol Decoding for the k-th Transmitted CCK Codeword $C_k$:
Required Inputs:
(a) Inputs from Algorithm #1:
(a1) $M_k$ initial estimates for the present CCK codeword $\hat{C}_{k,i}$ (i=1, 2, ..., $M_k$) and its corresponding ICI-corrected correlation outputs $P_{k,i}$
(a2) $M_{k+1}$ initial estimates for the next CCK codeword $\hat{C}_{k+1,j}$ (j=1, 2, ..., $M_{k+1}$) and its corresponding ICI-corrected correlation outputs $P_{k+1,j}$
(b) Inputs from the CIR estimation block 24: $\hat{F}_{low}$ and $\hat{B}_{up}$ (or equivalently, $F_i$'s and $B_i$'s, i=1, 2, ..., 7)

Step 1: To Mitigate the Impact of MPI (ISI) due to the Next CCK Symbol
(1a) For each of the $M_k$ initial estimates, $\hat{C}_{k,i}$, (i=1, 2, ..., $M_k$), calculate the MPI due to the next symbol for each of the $M_{k+1}$ initial estimates, $\hat{C}_{k+1,j}$, (j=1, 2, ..., $M_{k+1}$), according to the following equation:

$$\beta \cdot \hat{C}_{k+1,j}^H \hat{F}_{low}^H \hat{C}_{k,i}$$

where $\beta$ is a number between 0 and 1 with its optimal value determined by computer simulation.
(1b) For each of the results obtained from step (1a), locate the smallest value. In particular, for i=1, 2 ..., $M_k$ initial estimates, fix the index i and let index j vary between 1 and $M_{k+1}$, then find the index $j_{min}$ for each i such that $$\beta \cdot \hat{C}_{k+1,j_{min}}^H \hat{F}_{low}^H \hat{C}_{k,i} = \min_{j=1,2,...,M_{k+1}} \{\beta \cdot \hat{C}_{k+1,j}^H \hat{F}_{low}^H \hat{C}_{k,i}\}$$

(1c) Now for each of the $M_k$ initial estimates, with index i fixed, subtract $$\beta \cdot \hat{C}_{k+1,j_{min}}^H \hat{F}_{low}^H \hat{C}_{k,i}$$

from the corresponding i-th (out of $M_k$) ICI-corrected correlation outputs $P_{k,i}$ (obtained in Algorithm #1) to obtain a new set of $M_k$ correlation outputs $Q_{k,i}$ (i=1, 2, ..., $M_k$):

$$Q_{k,i} = P_{k,i} - \beta \cdot \hat{C}_{k+1,j^{minH}} \hat{F}_{low}^H \hat{C}_{k,i}$$

These correlation outputs represent the "best" correlation outputs for codeword candidates $\hat{C}_{k,i}$(i=1, 2, ..., $M_k$) with multipath interferences from the present and the next symbols mitigated.

Step 2: To Remove the MPI (ISI) due to the Previous CCK Symbol $C_{k-1}$ (2a) For each of the $M_k$ initial estimates, calculate the MPI due to the decoded previous symbol $\hat{C}_{k-1}$ at the output of the CCK Correlator 36b according to the following equation:

$$\hat{C}_{k-1}^H \hat{B}_{up}^H \hat{C}_{k,i}$$

where $\hat{C}_{k,i}$(i=1, 2, ..., $M_k$) are the $M_k$ CCK candidate symbols corresponding to the $M_k$ initial estimates for the k-th transmitted CCK codeword $C_k$.

(2b) Subtract $\hat{C}_{k-1}^H \hat{B}_{up}^H \hat{C}_{k,i}$ from the i-th correlation outputs obtained in Step (1c) above. For convenience of discussions below, let $W_{k,i}$ denote these correlation outputs:

$$W_{k,i} = Q_{k,i} - \hat{C}_{k-1}^H \hat{B}_{up}^H \hat{C}_{k,i} \text{ where } i=1, 2, \ldots, M_k.$$

These correlation outputs represent the "best" correlation outputs for codeword candidates $\hat{C}_{k,i}$(i=1, 2, ..., $M_k$) with multipath interferences from the previous, the present, and the next symbols mitigated.

Step 3: Joint Symbol Decoding

The joint symbol decoder 25 selects $C_{k,i}^{max}$ (i.e., the largest) as the decoded CCK codeword $\hat{C}_k$ for the k-th transmitted codeword $C_k$ with the index $i_{max}$ corresponding to the maximum correlation outputs $W_{k,i}$ in Step (2b) above. In other words, $$\hat{C}_k = \hat{C}_{k,i_{max}}, \text{ where } i_{max} \text{ is such that } W_{k,i_{max}} = \max_{i=1,2,\ldots,M_k} \{W_{k,i}\}$$

Let $\underline{C}_L$ represent the decoded k-th CCK codeword ($\hat{C}_k = \underline{C}_L$). The decoded data is the binary representation of L.

End of Algorithm #2

When implementing a joint decoder 25 as described in the above Algorithms #1 and #2, one skilled in the art does not necessarily have to follow the exact steps to achieve equivalent decoding results. For example, one can compute all $M_k \times M_{k+1}$ MPI-corrected correlation outputs for all indices i (i=1, 2, ..., $M_k$) and j (j=1, 2, ..., $M_{k+1}$) before making a decoding decision in Step 3 of Algorithm #2.

The number of initial estimates for the k-th codeword $C_k$ has been denoted as $M_k$. A joint decision rule to decode the k-th codeword $C_k$ utilizes a decoded codeword of the previous codeword $\hat{C}_{k-1}$, $M_k$ candidates of the present codeword $\hat{C}_{k,i}$(i=1, 2, ..., $M_k$) and $M_{k+1}$ candidates of the next codeword $\hat{C}_{k+1,j}$(j=1, 2, ..., $M_{k+1}$). In other words, when decoding the k-th codeword $C_k$, one needs to evaluate:

(1) $M_k$ correlations with the decoded codeword $\hat{C}_{k-1}$ to compensate for the MPI from the previous codeword; and (2) $M_k \times M_{k+1}$ correlations to represent the different MPI's from the $M_{k+1}$ potential next codewords.

Therefore, the complexity is proportional to the number $M_k + M_k \times M_{k+1}$.

If $M_k$ and/or $M_{k+1}$ are large numbers, then this kind of joint symbol decoder becomes impractical for implementation. Thus, a cost-effective algorithm should have small $M_k$ and $M_{k+1}$ values. Without loss of generality, one can assume that the number $M_k$ is fixed ($M_k$=M, $\forall$k) in the following discussion for all codewords. Since there are only 256 CCK codewords specified in the 802.11b specification, one may choose M=256, but this can result in a huge number of combinations, rendering any such joint symbol decoder to be impractical.

The primary concern in implementing such a joint symbol decoder 25 is, therefore, to reduce the required number of temporary codewords, M, so as to achieve near-optimum decoding performance. The following observations are useful to note:

1) In most practical environments, the multipath spreading is limited to ± one CCK symbol (8 chips or 727 ns long) only. A joint decision algorithm based upon three received symbols (the previous, the current, and the next symbols) provides optimum system performance.

2) The FMIC bias computation block 36a based on the invention in Ser. No. 10/289,749 provides a cost-effective and reliable way to obtain a reduced number of initial estimates M. This makes it possible to implement a near-optimum low-complexity joint symbol decoder 25. More specifically, the FMIC bias computation block 36a provides a cost-effective and reliable means to compute the ICI-corrected correlation outputs. Based on these ICI-corrected correlation outputs, one can then derive a very small number of initial estimates for a low-complexity joint symbol receiver. According to computer simulation results, superb decoding performance can be achieved even for M=2 or 3. Such small numbers can be easily implemented using today's technology.

Although the above descriptions have focused on a joint symbol decoder 25 for the 802.11b CCK operating at 11 Mbps mode, which uses 256 CCK codewords for its codebook, those skilled in the art can easily use the same principles and receiver architecture to decode the 802.11b CCK operating at 5.5 Mbps mode, which actually uses a 16 CCK codeword subset of the codebook containing 256 codewords.

EXAMPLE

The following example is provided to illustrate Algorithms #1 and #2. FIG. 6 shows the steps for Algorithm #1 and FIG. 7 shows the steps for Algorithm #2. The numerical values provided in this Example are solely for illustration purposes only, and do not necessarily represent realistic data.

In FIG. 6, since there are 256 CCK codeword candidates, each row in FIG. 6 is used to show results for each of the 256 CCK codeword candidates. The first column is used to provide the index m for each CCK codeword candidate. The second column shows the correlation outputs from CCK Correlator 36b for the k-th CCK codeword. The third column shows the pre-computed FMIC biases obtained from the FMIC Bias Computation 36a. The fourth column illustrates Step 1 in Algorithm #1 for the input data in the second and third columns. The fifth column illustrates Step 2 of Algorithm #1. Based on the ICI-corrected correlation outputs shown in the fourth column, the fifth column shows that the initial $M_k$($M_k$=3) candidates for the k-th codeword are $\underline{C}_1$, $\underline{C}_{254}$ and $\underline{C}_3$ (which are circled in FIG. 6). The last three columns (the sixth, seventh and eighth columns) in FIG. 6 illustrate Step 3 of Algorithm #1, where Steps 1 and 2 are essentially repeated for the k+1-$^{th}$ codeword to determine the initial $M_{k+1}$($M_{k+1}$=3) candidates for the k+1-$^{th}$ codeword. Here, the FMIC biases utilized for this Step 3 are the same FMIC biases set forth in the third column of FIG. 6. At the completion of Step 3, the initial $M_{k+1}$($M_{k+1}$=3) candidates for the k+1-$^{th}$ codeword are determined to be $\underline{C}_0$, $\underline{C}_{253}$ and $\underline{C}_4$ (which are circled). Throughout this example, it should be noted that wherever numerical values are shown in an equation, the Re{} function was shown to be mathematically correct.

In FIG. 7, the first column shows the index $M_k$. All other columns are used to show either a step or a sub-step of Algorithm #2. Specifically, the second column shows Step (1a) for Algorithm #2, where for each of the three initial codeword candidates ($\underline{C}_1$, $\underline{C}_{254}$ and $\underline{C}_3$) for the k-th codeword (indexed by i, where i=1,2,3 (=$M_k$)), one calculates the MPI due to the next symbol for each of the 3 initial codeword candidates ($\underline{C}_0$, $\underline{C}_{253}$ and $\underline{C}_4$) for the k+1-$^{th}$ codeword (indexed by j, where j=1, 2, 3(=$M_{k+1}$)). The third column shows Step (1b), where the j index corresponding to the minimum in Step (1a) is selected for each of the three initial candidates for the k-$^{th}$ codeword. For example, with the initial codeword candidate $\underline{C}_1$, the results obtained in Step (1a) (1.1, 0.5 and -0.2) are compared and the minimum value (-0.2) is determined (circled in FIG. 7). For each initial candidate for the k-$^{th}$ codeword, this minimum value is an estimated MPI (ISI) due to the next CCK codeword. The fourth column shows Step (1c). In Step (1c), the estimated MPI due to the next codeword (the k+1-$^{th}$ CCK codeword) is subtracted from the ICI-corrected correlation outputs $P_{k,i}$ to obtain $Q_{k,i}$ for each of the initial candidates for the k-th CCK codeword. In this example, $Q_{k,1}$=9.2, $Q_{k,2}$=9.4, and $Q_{k,3}$=7.9. The fifth column shows Step (2a) of Algorithm #2. With the k-1-$^{th}$ CCK codeword already decoded (the k-1-$^{th}$ CCK codeword, denoted as $\hat{C}_{k-1}$), one computes the MPI due to the previous CCK codeword for each of the initial candidates for the k-th codeword as follows:

$$\hat{C}_{k-1}{}^H \hat{B}_{up}{}^H \hat{C}_{k,1} = \hat{C}_{k-1}{}^H \hat{B}_{up}{}^H \underline{C}_1$$

$$\hat{C}_{k-1}{}^H \hat{B}_{up}{}^H \hat{C}_{k,2} = \hat{C}_{k-1}{}^H \hat{B}_{up}{}^H \underline{C}_{254}$$

$$\hat{C}_{k-1}{}^H \hat{B}_{up}{}^H \hat{C}_{k,3} = \hat{C}_{k-1}{}^H \hat{B}_{up}{}^H \underline{C}_3$$

In this example, their values are found to be 0.2, -1 and 0.6 respectively. The sixth column shows Steps (2b) and 3. In Step (2b), the MPI due to the previous CCK codeword is subtracted from $Q_{k,i}$ for each of the initial candidates for the k-$^{th}$ CCK codeword to obtain $W_{k,i}$. In this example, $W_{k,1}$=9, $W_{k,2}$=10.4, and $W_{k,3}$=7.3. $W_{k,i}$ represents the correlation outputs with all MPI's corrected for each of the initial candidates for the k-th CCK codeword. In Step (3), the k-th codeword is decoded. In this example, it is determined that $W_{k,2}$ (circled in FIG. 7) is the maximum correlation output with all MPI's corrected. Thus, the decoded codeword is $\hat{C}_k = \hat{C}_{k,2} = \underline{C}_{254}$, and the decoded data bits are 11111110, which is the binary representation for 254.

Those skilled in the art will appreciate that the embodiments and alternatives described above are non-limiting examples only, and that certain modifications can be made without departing from the spirit and scope thereof. The accompanying claims are intended to cover such modifications as would fall within the true scope and spirit of the present invention.

What is claimed is:

1. A method for mitigating the multipath interference experienced by a present CCK symbol, comprising:

(i) pre-computing a plurality of multipath interference biases which are a post-correlation representation of the intra-symbol chip interference (ICI) for the present CCK symbol;

(ii) generating correlation outputs for the present CCK symbol;

(iii) based on the plurality of multipath interference biases and the correlation outputs for the present CCK symbol, obtaining ICI-corrected correlation outputs for the present CCK symbol;

(iv) based on the ICI-corrected correlation outputs for the present CCK symbol, obtaining a set of initial candidates for the present CCK symbol;

(v) generating correlation outputs for the next CCK symbol;

(vi) based on the plurality of multipath interference biases and the correlation outputs for the next CCK symbol, obtaining ICI-corrected correlation outputs for the next CCK symbol;

(vii) based on the ICI-corrected correlation outputs for the next CCK symbol, obtaining a set of initial candidates for the next CCK symbol;

(viii) for each of the candidates for the present CCK symbol, obtaining first ISI-mitigated correlation outputs where both the ICI due to the present CCK symbol and the inter-symbol interference (ISI) due to the next CCK symbol have been corrected;

(ix) for each of the candidates for the present CCK symbol, and based on the first ISI-mitigated correlation outputs, obtaining second ISI-mitigated correlation outputs where the ISI due to the previous CCK symbol has also been corrected; and (x) decoding the present CCK symbol based on the second ISI-mitigated correlation outputs.

2. The method of claim 1, wherein step (viii) further includes:

for each of the candidates for the present CCK symbol, computing corresponding post-correlation ISI biases due to each of the candidates of the next CCK symbol;

for each of the candidates for the present CCK symbol, selecting from the computed post-correlation ISI biases the smallest post-correlation ISI bias; and for each of the candidates for the present CCK symbol, subtracting the corresponding post-correlation ISI bias from its corresponding ICI-corrected correlation output to obtain the first ISI-mitigated correlation outputs.

3. The method of claim 1, wherein step (ix) further includes:

for each of the candidates for the present CCK symbol, computing corresponding post-correlation ISI biases due to the previous CCK symbol; and for each of the candidates for the present CCK symbol, subtracting the corresponding post-correlation ISI bias due to the previous CCK symbol from the corresponding first ISI-mitigated correlation outputs to obtain the second ISI-mitigated correlation outputs.

4. The method of claim 2, wherein step (ix) further includes:

for each of the candidates for the present CCK symbol, computing corresponding post-correlation ISI biases due to the previous CCK symbol; and for each of the candidates for the present CCK symbol, subtracting the corresponding post-correlation ISI bias due to the previous CCK symbol from the corresponding first ISI-mitigated correlation outputs to obtain the second ISI-mitigated correlation outputs.

5. The method of claim 1, wherein the decoding in step (x) is accomplished by selecting, among the candidates for the present CCK symbol, the candidate whose second ISI-mitigated correlation output is the largest value, with the decoded data being the binary representation of the index of the selected CCK codeword candidate.

6. The method of claim 4, wherein the decoding in step (x) is accomplished by selecting, among the candidates for the present CCK symbol, the candidate whose second ISI-mitigated correlation output is the largest value, with the decoded data being the binary representation of the index of the selected candidate.

7. A RAKE receiver employable in a multipath environment, the receiver receiving Complementary Code Keying (CCK) symbols that include a present CCK symbol, a previous CCK symbol, and a next CCK symbol, comprising:

channel estimation means for determining a channel impulse response based on Barker Code correlation, and generating CMF tap weights, feedback (FB) tap weights and feed-forward (FF) tap weights;

FMIC means coupled to the feedback tap weights and feed-forward tap weights for calculating a plurality of multipath interference (MPI) biases which is a post-correlation representation of intra-symbol chip interference (ICI) for the present CCK symbol;

a channel matched filter (CMF) coupled to receive the CMF tap weights from the channel estimation means and having an output;

a CCK correlator having an input coupled to the output of the channel matched filter, the CCK correlator generating correlation outputs; and a decoder having inputs coupled to the FMIC means to receive the plurality of multipath interference (MPI) biases for mitigating the ICI from the present CCK symbol, inputs coupled to the channel estimation means for receiving the FF tap weights and the FB tap weights that are used to compute the MPI biases due to the previous CCK symbol and the next CCK symbol, and inputs coupled to the CCK correlator to receive the correlation outputs from the CCK correlator for mitigating the ICI from the present CCK symbol, and the Inter-Symbol Interference (ISI) from the next CCK symbol and the previous CCK symbol.

8. The receiver of claim 7, further including a selector having separate outputs coupled to the channel estimation means and the channel matched filter for selecting operation in one of two separate modes.

* * * * *